US006968193B2

(12) United States Patent
Van Loon et al.

(10) Patent No.: US 6,968,193 B2
(45) Date of Patent: Nov. 22, 2005

(54) OPTIMIZED ROUTING OF A CALL TO A ROAMING SUBSCRIBER

(75) Inventors: Johannes Maria Van Loon, Zoetermeer (NL); Ivan Markoski, The Hague (NL)

(73) Assignee: Koninklijke Kpn N.V., Groningen (NL)

( * ) Notice: Subject to any disclaimer, the term of this patent is extended or adjusted under 35 U.S.C. 154(b) by 447 days.

(21) Appl. No.: 10/168,202
(22) PCT Filed: Nov. 29, 2000
(86) PCT No.: PCT/EP00/11934
   § 371 (c)(1),
   (2), (4) Date: Sep. 23, 2002
(87) PCT Pub. No.: WO01/47311
   PCT Pub. Date: Jun. 28, 2001

(65) Prior Publication Data
   US 2003/0119549 A1 Jun. 26, 2003

(30) Foreign Application Priority Data
   Dec. 22, 1999 (NL) ............................................. 1013930

(51) Int. Cl.[7] ................................................. H04Q 7/20
(52) U.S. Cl. ..................................................... 455/455
(58) Field of Search ......................................... 455/455

(56) References Cited

U.S. PATENT DOCUMENTS 6,006,094 A 12/1999 Lee ............................ 455/445

FOREIGN PATENT DOCUMENTS

EP        0 605 120      7/1994
WO     WO98/11754     3/1998

OTHER PUBLICATIONS

Yung–Jan Cho et al, "Reducing the Network Cost of Call Delivery to GSM Roamers", IEEE Network, vol. 11, No. 5, Sep.–Oct. 1997, pps. 19–25.

Primary Examiner—William D. Cumming
(74) Attorney, Agent, or Firm—Michaelson & Associates; Peter L. Michaelson; Alberta A. Vitale

(57) ABSTRACT

System for mobile telecommunication, comprising a first mobile network (KTm), connected to a first nonmobile network (KTv) having routing means (X). Terminals connected to the nonmobile network may set up a connection with mobile terminals having the first or a second mobile network as their home network. A mirror register (MLR), connected to the routing means in the nonmobile network, is used to record a copy of the user profile transferred by the HLR register of the home network of a roaming mobile terminal to the VLR register of the non-home network. The user profile stored in the mirror register in this manner is then used—together with the VLR—to directly drive the routing means X of the nonmobile network KTv, as a result of which the routing path is considerably shortened.

2 Claims, 2 Drawing Sheets

OPTIMIZED ROUTING OF A CALL TO A ROAMING SUBSCRIBER

BACKGROUND OF THE INVENTION

The invention relates to a system for mobile telecommunication, comprising a first network arranged for mobile telecommunication—the first mobile network—, connected to a first network arranged for nonmobile telecommunication—the first nonmobile network—, suitable for setting up connections between, on the one hand, terminals whose connections are routed by way of routing means within the first nonmobile network, and, on the other hand, terminals whose connections are routed using registers within the first mobile network or registers within a second network arranged for mobile telecommunication—the second mobile network—, a first register in both mobile networks comprising information relating to mobile terminals having the first or second, as the case may be, mobile network as a home network, and a second register comprising information relating to mobile terminals which, irrespective of their home network, make use of the first or second mobile network, respectively, while, if a terminal having the first mobile network as its home network wants to make use of the second mobile network, the second register of the second mobile network receives a user profile from the first register of the first mobile network, comprising system data relating to the user of said terminal. The above relates to the case in which a terminal having the first mobile network as its home network, wants to make use of the second mobile network. The invention, however, also relates to the inverse situation, namely, that a terminal having the second mobile network as its home network, wants to make use of the first mobile network. In said inverse situation, the second register of the first mobile network receives a user profile from the first register of the second mobile network. It is known that a call to a mobile terminal ("mobile user") abroad (i.e., outside the range of its home network), is first routed to the home network. Then, it is rerouted from the home network to the destination network, where the user/terminal is located. For the inverse situation, the same applies—mutatis mutandis. All of this implies a long routing path for this kind of call. This results in additional costs (an interconnection twice), a more extensive connection-buildup time and a deteriorated speech quality, since a longer path has to be covered.

SUMMARY OF THE INVENTION

The object of the invention is to overcome said drawbacks.

For this purpose, the invention provides for a telecommunication system of the aforementioned kind, which system, according to the invention, comprises a mirror register connected to the routing means in the first nonmobile network in which, under control of control means, a copy of the user profile given off by the first register of the first mobile network is received and recorded, for routing a call from the first nonmobile network to said mobile terminal making use of the second mobile network having the first mobile network as its home network, the control means extracting routing information for the routing means of the first nonmobile network from the user profile recorded in the mirror register associated with (the user) of said terminal.

The core of the invention consists of the application of a mirror register (Mirror Location Register) in the immediate vicinity of the routing means of the nonmobile network.

According to the invention, a copy of the user profile of the user of the mobile terminal is transmitted from the first register—the "Home Location Register" (HLR)—of the mobile network to the mirror register and recorded there. The contents of the user profile is then used by the routing means of the nonmobile network—connected to the mirror register—for routing calls from the nonmobile network to the mobile terminal in a much more direct manner than is the case according to the prior art.

Preferably, the routing information extracted from the mirror register for the routing means of the first nonmobile network, is completed, under control of the control means, by routing information from the second register of the second mobile network.

The above relates to the case in which a terminal, having the first mobile network as its home network, wants to make use of the second mobile network. In the inverse situation, in which a terminal having the second mobile network as its home network, wants to make use of the first mobile network, in the mirror register connected to the routing means of the first nonmobile network, a copy of the user profile received by the first register of the second mobile network is recorded, and, for routing a call from the first nonmobile network to the first mobile network making use of the first mobile network, and having the second mobile network as its home network, the control means extract routing information for the routing means of the first nonmobile network from the user profile of the user recorded in the mirror register.

In this case, routing information for the routing means (X) of the first nonmobile network, extracted from the mirror register (MLR), is preferably completed by routing information from the second register (VLR) of the first mobile network (KTm).

With the measures according to the invention, it is achieved that if—in both situations sketched—a mobile terminal makes use of another network than its home network (the term "roaming" is then used), a call is routed directly to said other network and not, as is customary, by way of its home network.

DESCRIPTION OF THE FIGURES

The operation of the invention is further explained below on the basis of several figures.

DETAILED DESCRIPTION OF THE INVENTION

Both figures show a system for mobile telecommunication, comprising a first network KTm, arranged for mobile telecommunication—the first mobile network—, connected to a first network KTv arranged for nonmobile telecommunication ùthe first nonmobile network ùsuitable for setting up connections between, on the one hand, an (in this case) wirelined terminal TKTv, whose connections are routed by way of routing means (telephone exchanges, switches, Service Control Points etc.) X within the first nonmobile network KTv and, on the other hand (mobile) terminals whose connections ùby way of GSM-network modules, such as MSCs (Mobile Switching Centres), BSCs (Base-Station Controllers) etc. ùare routed using "Home-Location Registers" (HLR) and "Visitor-Location Registers" (VLR) within the first mobile network ù or using similar registers HLR and VLR within a second network DTm arranged for mobile telecommunication ùthe second mobile network. In both mobile networks, the respective HLRs contain information relating to mobile terminals or their users, as the case may be, with the first or second, as the case may be, mobile network as its home network; the VLRs contain information relating to the mobile terminals or their users, as the case may be, who make use of the mobile network, irrespective of their home network.

Figure 1:
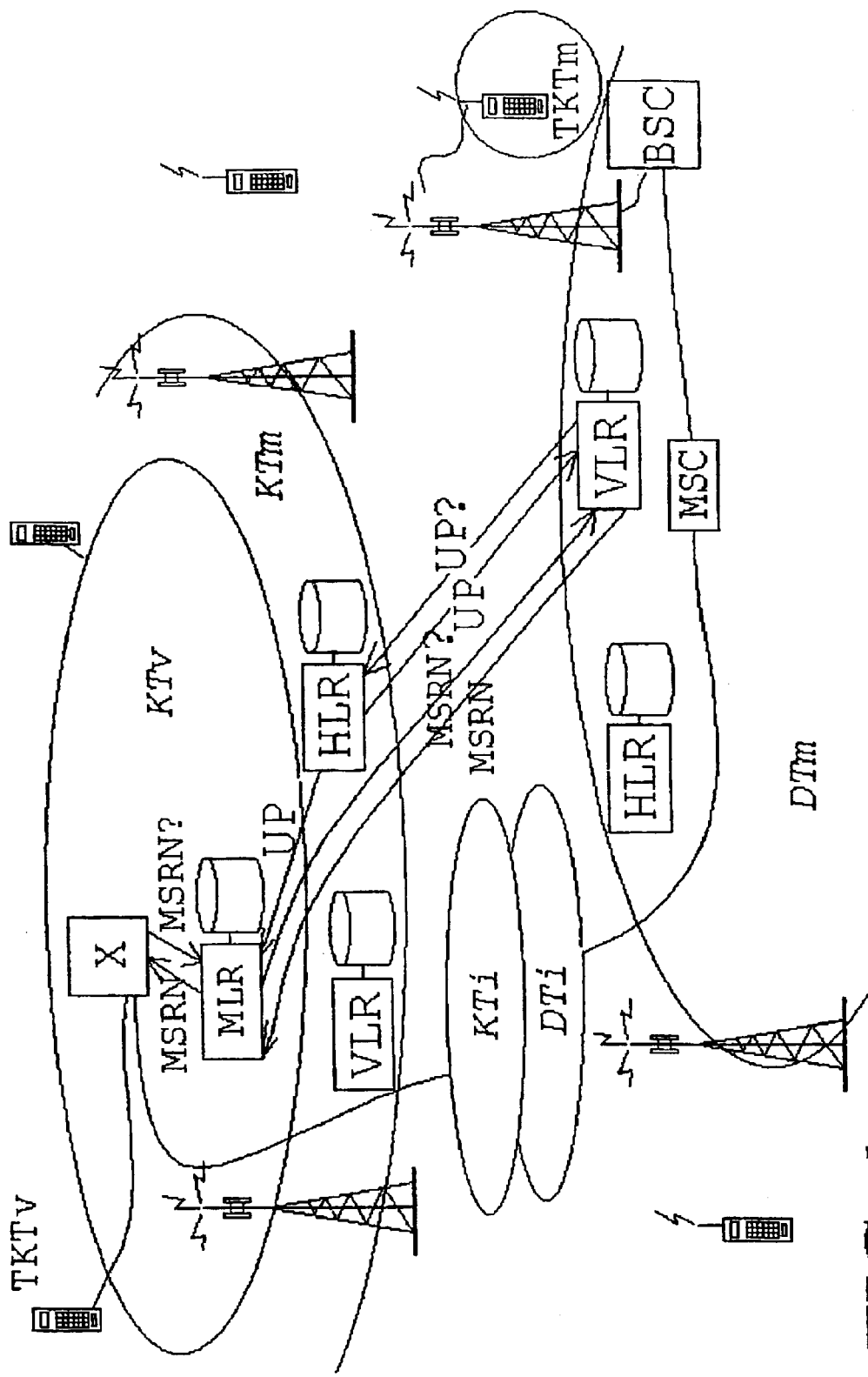
FIG. 1 shows the operation of the invention if the nonmobile network connected to the home network of said roaming terminal is provided with a mirror register, as the invention proposes.

If, as FIG. 1 illustrates, a terminal TKTm having the first mobile network KTm as its home network, wants to make use of the second mobile network DTm, the second register VLR of the second mobile network DTm at its request ("UP?") receives a user profile UP from the first register HLR of the first mobile network KTm, comprising system data relating to the user of said terminal, such as user rights, subscription type etc.

Here, a mirror register MLR, connected to the routing means X in the first nonmobile network KTv, receives a copy of the user profile UP given off by the first register HLR of the first mobile network, and records it.

For routing a call from terminal TKTv to the mobile terminal TKTm roaming near the second mobile network DTm (having the network KTm as its home network), routing information for the routing means X of the first nonmobile network is extracted from the user profile UP recorded in the mirror register MLR of the user of said terminal TKTm. In particular, the "Mobile Subscriber Roaming number" MSRN is transmitted to the routing means and used there for routing the call thereto.

As represented in the figure, said MSRN is preferably obtained from the second register VLR of the second mobile network DTm, mentioning parameters required for that purpose from the user profile, stored in the mirror register, of the (user of the) roaming mobile terminal TKTm.

Figure 2:
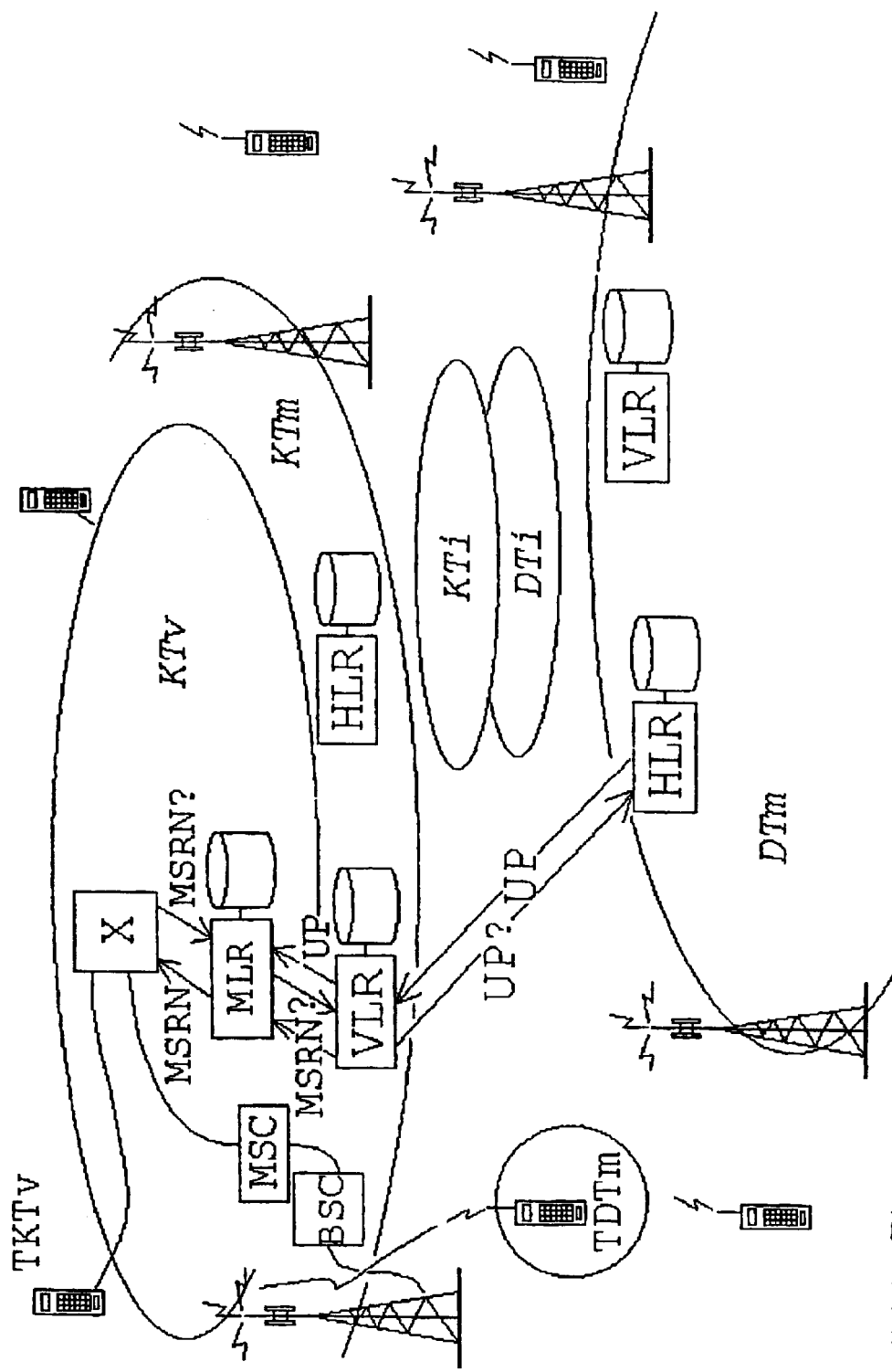
FIG. 2 shows the operation of the invention if the roaming terminal makes use of a mobile network whose underlying nonmobile network is provided with a mirror register.

FIG. 2 shows the operation of the invention if a roaming terminal TDTm makes use of the mobile network KTm, whose underlying nonmobile network KTv is provided with the mirror register MLR. The terminal TDTm has the mobile network DTm as its home network. In this case, the second register VLR of the mobile network KTm receives, from the first register HLR of the second mobile network DTm, a user profile UP relating to the user of said terminal having user data (user parameters). The mirror register MLR, connected to the routing means X in the first nonmobile network KTv receives and records, under control of its control means, a copy of the user profile UP given off by the register HLR of the second mobile network DTm. For routing a call from a terminal TKTv connected to the nonmobile network KTv to the roaming mobile terminal TDTm ùhaving the mobile network DTm as its home network ùthe control means extract routing information for the routing means X in the nonmobile network KTv from the user profile recorded in the mirror register MLR of the user of said terminal TDTm.

Said MSRN, as represented in the figure, is preferably obtained from the second register VLR of the first mobile network KTm, mentioning parameters required for this purpose from the user profile stored in the mirror register of the (user of the) roaming mobile terminal TDTm.

In both cases illustrated in FIGS. 1 and 2, respectively, the invention implies the use of a mirror register MLR (Mirror-Location Register) in the nonmobile network KTv, where a copy of the user profile transferred to the VLR register by the HLR register is recorded. The user profile thus stored in the mirror register MLR is then used to directly drive the routing means X of the nonmobile network KTv.

It is to be noted that the HLR, the VLR and the MLR, apart from the register proper, also comprise control means for approaching, exchanging or processing the system information stored in the registers; in the figures, said functions are drawn as separate entities ùa control "box" and a data-base symbol.

What is claimed is:

1. System for mobile telecommunication, comprising a first network arranged for mobile telecommunication (KTm), the first mobile network, connected to a first network arranged for non-mobile telecommunication (KTv), the first non-mobile network, suitable for setting up connections between, terminals (TKTv) whose connections are routed by way of routing means (X) within the first non-mobile network (KTv) and terminals whose connections are routed using registers (HLR, VLR) within the first mobile network or using registers (HLR, VLR) within a second network arranged for mobile telecommunication (DTm), the second mobile network, wherein, in both networks, a first register (HLR) contains information relating to mobile terminals having the first or second mobile network as their home network, and a second register (VLR) contains information relating to mobile terminals that, irrespective of their home network, make use of the first or second mobile network, while, in case A, if a terminal (TKTm) having the first mobile network (KTm) as its home network wants to make use of the second mobile network (DTm), the second register (VLR) receives a user profile for the second mobile network (DTm) from the first register (HLR) of the first mobile network (KTm), comprising system data relating to the user of said terminal (TKTm), and while, in case B, if a terminal (TDTm) having the second mobile network (DTm) as its home network, wants to make use of the first mobile network (KTm), the second register (VLR) receives a user profile for the first mobile network (KTm) from the first register (HLR) of the second mobile network (DTm), comprising system data relating to the user of said terminal (TDTm), characterized by a mirror register, located in the first non-mobile network (KTv) and connected to the routing means (X) wherein, under control of control means, a copy of the user profile given off by the first register (HLR)-of the first or second mobile network is recorded, while, in case A, when routing a call from the first non-mobile network (KTv) to said mobile terminal (TKTm) making use of the second mobile network (DTm) having the first mobile network (KTm) as its home network, the control means extract routing information for the routing means (X) of the first non-mobile network from the user profile recorded in the mirror register of the user making use of said terminal (TKTm), and while, in case B, when routing a call from the first non-mobile network (KTv) to said mobile terminal (TDTm) making use of the first mobile network (KTm) having the second mobile network (DTm) as its home network, the control means extract routing information for the routing means (X) of the first non-mobile network from the user profile recorded in the mirror register of the user making use of said terminal (TDTm).

2. System according to claim 1, characterized in that routing information for the routing means (X) of the first non-mobile network, extracted from the mirror register is supplemented, under control of the control means, with routing information from the second register (VLR) of the first mobile network, for case B, or of the second mobile network, for case A.

* * * * *